No. 695,008. Patented Mar. 11, 1902.
R. STUCKWISCH.
PLANTER.
(Application filed May 6, 1901.)
(No Model.) 3 Sheets—Sheet 1.
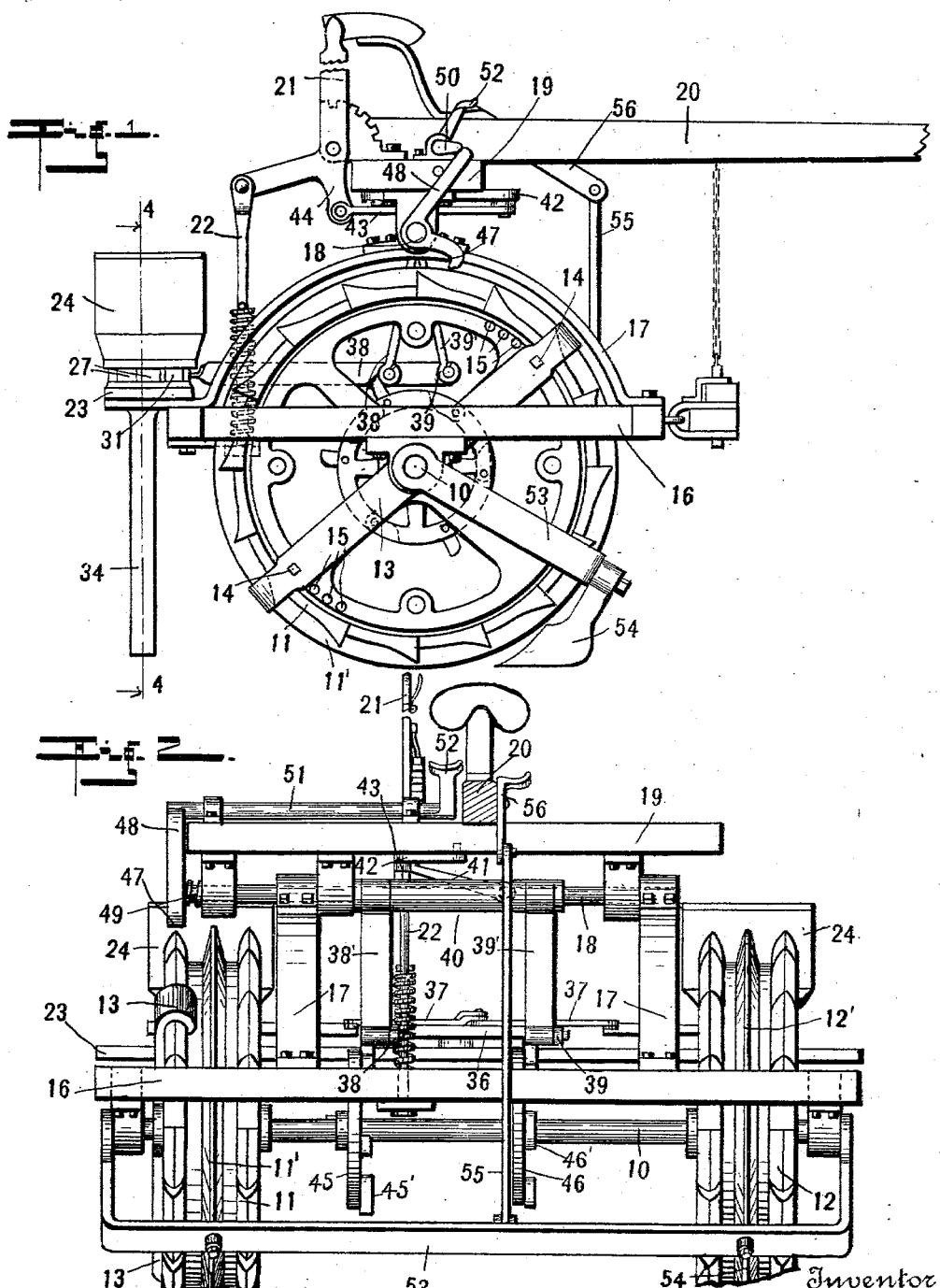
Witnesses
Frank A. Fable
Bertha M. Ballard
Inventor
Rudolph Stuckwisch
By
Arthur M. Hood
Attorney
THE NORRIS PETERS CO., PHOTO-LITHO., WASHINGTON, D. C.

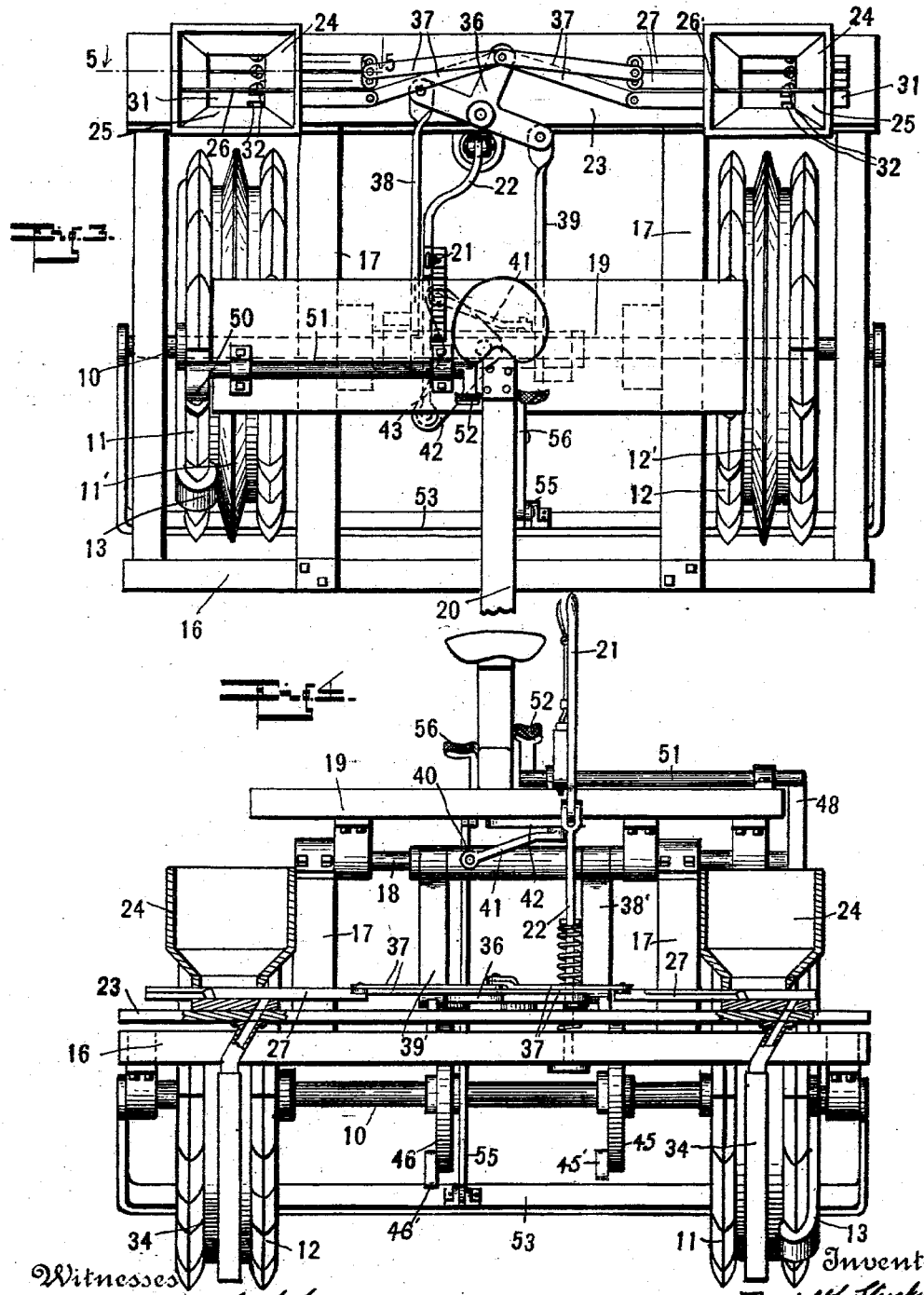

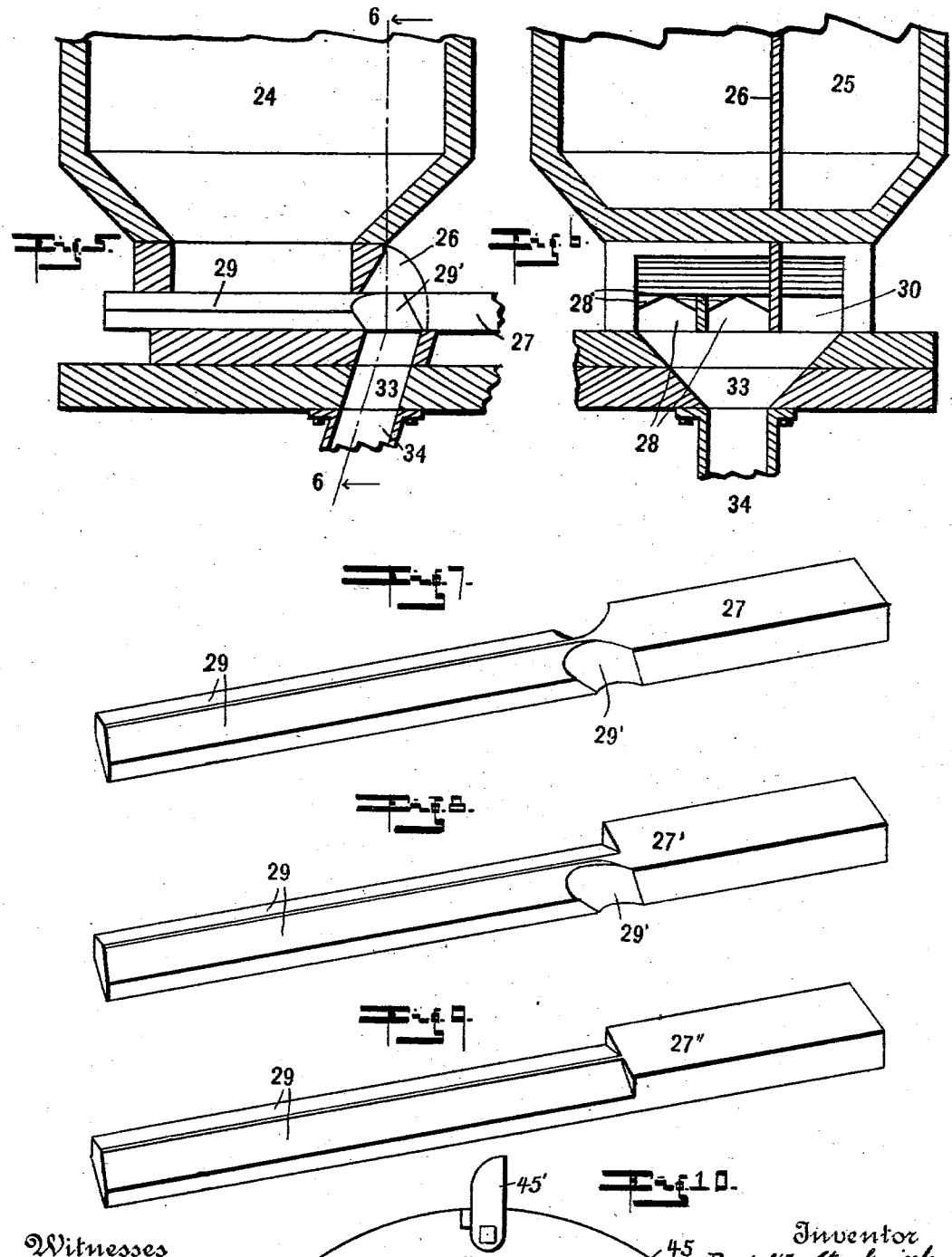

UNITED STATES PATENT OFFICE.

RUDOLPH STUCKWISCH, OF INDIANAPOLIS, INDIANA.

PLANTER.

SPECIFICATION forming part of Letters Patent No. 695,008, dated March 11, 1902.

Application filed May 6, 1901. Serial No. 58,852. (No model.)

*To all whom it may concern:*

Be it known that I, RUDOLPH STUCKWISCH, a citizen of the United States, residing at Indianapolis, in the county of Marion and State of Indiana, have invented a new and useful Planter, of which the following is a specification.

My invention relates to improvements in check-row corn-planters, especially the dropping mechanism thereof.

The object of my invention is to provide a dropping mechanism by means of which any desired number of grains may be dropped simultaneously, to provide improved means for dropping the grains, to provide means for throwing the dropping mechanism out of action, to provide means for alining the drop, to provide means for dropping a uniform quantity of fertilizer closely adjacent each quantity of seed, and to provide such improvements in details of construction as shall be hereinafter pointed out.

The accompanying drawings illustrate my invention, the same being applied to a machine the body of which is similar to that shown in my Patent No. 626,011, issued May 30, 1899.

Figure 1 is a side elevation. Fig. 2 is a front elevation. Fig. 3 is a plan. Fig. 4 is a section on line 4 4 of Fig. 1. Fig. 5 is an enlarged section on line 5 5 of Fig. 3. Fig. 6 is a section on line 6 6 of Fig. 5. Fig. 7 is a perspective of a two-grain dropper-slide. Fig. 8 is a perspective of a one-grain dropper-slide. Fig. 9 is a perspective of a blank dropper-slide. Fig. 10 is a detail.

In the drawings, 10 indicates an axle or shaft upon which is loosely mounted a pair of wheels 11 and 12, said wheels being provided with V-shaped peripheral flanges 11' and 12', respectively. Secured to axle 10 is an arm 13, the ends of which extend beyond the periphery of the adjacent wheel 11. Arm 13 may be secured to the adjacent wheel 11 by means of a bolt 14, said bolt being inserted in any one of a series of holes 15, whereby the relative position of the arm and the wheel may be varied.

Pivoted upon the outer end of shaft 10, which extends beyond both supporting-wheels, is a frame 16, to which is secured a pair of arches 17. Secured to the upper side of arches 17, parallel to and substantially vertically over shaft 10, is a rod 18, upon which is pivoted a bar 19, to which is secured the tongue 20, the arrangement being similar to that shown in my patent above mentioned, and the position of the frame 16 with relation to the tongue being controlled by means of a hand-lever 21, pivoted upon tongue 20, and a link 22, pivoted at one end to the lever 21 and at the other end to the rear side of frame 16.

Secured to the rear side of frame 16 is a platform 23, upon which I mount my improved dropping mechanism, said mechanism consisting of a seed-hopper 24 and a fertilizer-hopper 25, the two hoppers being built together, if desired, and separated by a partition 26.

The seed is dropped by means of a reciprocating dropper-slide 27, which is mounted in a suitable guideway 28, formed in the bottom of said hopper. That portion of the dropper-slide which lies within the hopper has its upper corners beveled, so as to form a pair of beveled faces 29, the upper wall 28' of the guideway 28 being correspondingly formed, as shown in Fig. 6. At or near the point of junction of the face 29 with the main body of the slide, the upper face of which is plain, I form a seed-groove 29', which extends transversely through the slide. Groove 29' is large at its upper end and is inclined downward beneath the main body of the slide or in the direction of movement of the slide from the receiving to the dropping position. For some purposes I provide some slides, Fig. 9, having no seed-grooves, and I also provide some slides provided with but one seed-groove, as shown in Fig. 8. As many guides 28 may be formed in the bottom of hopper 24 as may be desired, each side being provided with that form of dropper-slide 27 which may be needed to enable the operator to drop as many grains of seed as he may desire. In ordinary instances in planting corn it is rarely desired to drop more than four seeds at a time, in which case there would be two guides 28 and the operator would use two two-grain dropper-slides 27. If he desires to drop only three grains, he will use one two-grain slide 27 and one one-grain slide 27'. To drop two grains, one blank slide will be used with a two-grain slide, and to drop one grain a blank slide will be used with a one-grain slide.

Formed in the bottom of the fertilizer-hopper 25 is a guide 30, in which is mounted a fertilizer-slide 31, provided with one or more transverse grooves 32, which may be either straight grooves or like grooves 29'. Leading from the guides 28 and 30 at a point beyond the side of the hopper is a chute 33, which leads down into a shoe-pipe 34. One of the dropper mechanisms just described is mounted immediately to the rear of each supporting-wheel.

In order to automatically operate the dropper-slides, I provide the following mechanism: Pivoted upon platform 23 is a T-shaped bell-crank lever 36, to the third arm of which are pivoted links 37, which are connected to the dropper-slides 27 and the fertilizer-slides 31. Pivoted to the opposite arms of lever 36 are two links 38 and 39, the forward ends of which are pivoted to links 38' and 39', the upper ends of which are pivoted upon a sleeve 40, longitudinally movable upon rod 18. Pivoted to sleeve 40 is one end of a link 41, the opposite end of which is pivoted to one arm of a bell-crank lever 42, pivoted upon a vertical axis on the under side of bar 19. Pivoted to the other arm of lever 42 is one end of a link 43, the opposite end of which is pivoted to an arm 44, carried by lever 21, the arrangement being such that when lever 21 is swung so as to throw the rear ends of the frame 16 upward the sleeve 40 will be shifted longitudinally upon the rod 18. Means operated by the axle should be provided to operate links 38' and 39'. For this purpose I secure to the axle a pair of disks 45 and 46, to each of which is secured a series of adjustable fingers 45' and 46', respectively, any one of which may be thrown so as to project beyond the periphery of its disk in position to contact with the link 38' or 39'.

Disks 45 and 46 are so set upon the axle that one of the fingers 46' will come into engagement with its link 39' immediately after one of the fingers 45' has engaged and thrown the link 38' and swung said link to the end of its throw, so as to thereby swing lever 36 to bring the dropper and fertilizer slides to a point where their grooves 29 and 32, respectively, will register with the discharge-chute 33, the arrangement being such that by the rotation of shaft 10 the dropper-slides are moved positively both forward and back by the fingers 45' and 46', respectively. Any desired number of fingers 45' and 46' may be arranged on the disks, depending upon the diameter of the wheels and the distance desired between points of drop. Any number of said fingers may be thrown into or out of operative position.

Pivoted upon an extended end of rod 18 is a hook 47, which is adapted to be thrown into engagement with either end of arm 13. Hook 47 is provided with an operating-arm 48, and said hook is normally held out of the path of movement of arm 13 by means of a spring 49. Engaging arm 48 of hook 47 is a cam or arm 50, carried by a shaft 51, provided with a foot-lever 52, the arrangement being such that the operator by pressing upon lever 52 may throw hook 47 down into the path of movement of arm 13, so as to hold the wheel 11, and consequently the shaft 10, from rotation, the entire machine being then slipped upon the ground by the team, enough slippage being allowed to compensate for the differences in alinement.

Pivoted upon the shaft 10 is a frame 53, to which is secured a pair of furrow-opening plows 54, one of which is supported immediately in front of each flange 11' and 12'. The plows 54 may be drawn up away from the ground by means of a link 55 and foot-lever 56.

The operation is as follows: The operator places in guides 28 that combination of slides 27 which will give the number of grooves 29' corresponding to the number of seeds he desires to deposit in any hill and connects said slides, together with the fertilizer-slides, with the third arm of the bell-crank lever 36. After filling the hoppers 24 and 25 with seed and fertilizer, respectively, the operator throws lever 21 down, (to the right in Fig. 1,) so as to draw the rear side of frame 16 upward. This movement of lever 21 swings lever 42 so as to shift sleeve 40 upon rod 18 and throw links 38' and 39' out of the paths of movement of the ends of fingers 45' and 46', respectively, so that in driving the machine to the field the dropper mechanism is not operated. When the field is reached, the lever 21 is returned to its normal position, and as the machine is advanced the rotation of axle 10 will bring a finger 45' into engagement with link 38', so as to swing lever 36 and shift the dropper-slides and fertilizer-slides, and thus bring grooves 29' and 32 over chute 33. As these grooves pass between the side wall of the hoppers connection between the hoppers and grooves is cut off and any material in said grooves drops into the chute 33. Owing to the inclination of the grooves 29' there is practically no liability of a corn-kernel becoming caught between the wall of the groove and the wall of the hopper, the hopper-wall tending to tilt any kernel which may project above the slide, this tilting throwing the kernel down into the line of movement of the slide. As soon as finger 45' leaves link 38' a finger 46' comes into engagement with link 39' and positively returns the dropper and fertilizer slides to their receiving positions, where the grain and fertilizer may fall down into said grooves. It will be readily noticed that the movement of the slides is positive in both directions and depends entirely upon the distance traveled by the machine, seed and fertilizer being dropped accurately each time the machine has been moved a predetermined distance. When the end of the row has been reached and the machine turned, it often occurs that a perfect alinement is not had with the position of drop in the row preceding. It is for this purpose that arm 13 is extended beyond the periphery of the adjacent wheel 11, said arm being such as to form a depression in the ground at regular intervals. This arm is set in advance of one finger 45' a distance equal to the distance which will be traveled by the machine during the time occupied by a seed in dropping from the chute 34 to the ground. This distance will vary according to the speed with which the different teams will walk, and in order to compensate for this difference the relative position between the arm 13 and the fingers 45' and 46' may be regulated by adjusting disks 45 and 46 by shifting arm 13. In order, therefore, to bring arm 13 to a position where it may make its depression in the new row in alinement with the depression of the preceding row, the operator may shift said arm upon the wheel by means of bolt 14. In most cases, however, it will be handier for the operator to press upon foot-lever 52, so as to swing hook 47 into position to engage arm 13, and thus prevent the rotation of the wheel and axle and cause a slippage of the entire machine along the ground any required distance. The operator will soon learn to gage the required distance of slippage quite accurately.

I claim as my invention—

1. In a planter, the combination with a receptacle, of a guideway formed in the bottom thereof, a dropper-slide, having an inclined face 29 and an inclined transverse groove 29' mounted in said guideway, a discharge-chute leading from the bottom of said guideway at a point beyond the hopper, and means for reciprocating the slide so as to intermittently bring the groove therein beneath the wall of the hopper and into register with the discharge-chute.

2. In a planter, the combination with the furrow-openers and a rotatable axle, of a seed-receptacle, a reciprocable dropper-slide mounted therein, a pair of arms carried by the axle, a pair of links arranged to normally lie in the paths of movement of said arms, connections between said links and dropper-slide, and means for shifting said links transversely out of the paths of movement of said arms, and for simultaneously withdrawing the furrow-openers from the ground.

3. In a planter, the combination with a rotatable axle and the supporting-wheels thereof, of an arm projecting beyond the periphery of one of said wheels, means for securing said arms to said wheel, a seed-receptacle, dropping mechanism mounted therein, means operated by the axle for operating said dropping mechanism, a frame supported upon said axle, a catch carried by said frame, and means for throwing said catch into engagement with the wheel so as to prevent the rotation of the axle.

4. In a planter, the combination with a supporting-wheel and rotatable axle carried thereby, of a frame pivoted upon said axle, a tongue pivoted upon said frame substantially vertically above the axle, a lever 21 pivoted upon said tongue, connections between said lever and frame whereby said frame may be swung upon the axle, a seed-receptacle carried by said frame, a receptacle dropper-slide mounted therein, a pair of arms carried by the axle, a pair of links pivoted upon the frame and having their free ends normally in the paths of movement of said arms, connections between said links and the dropper-slide, and intermediate connections between said links and the lever 21 for causing a transverse movement of said links by a movement of the lever.

5. In a dropping mechanism for planters, the combination with a seed-receptacle, of a pair of guideways formed in the bottom of said receptacle, a discharge-chute leading from said guideways, a series of dropper-slides each provided with a different number of seed-openings and each adapted to be mounted in either of said guideways, and means for reciprocating said dropper-slides in said guideways.

6. In a planter, a dropper-slide having an inclined upper face, 29, and a groove extending from said face transversely through the slide, the said groove being enlarged at its upper end and inclined therefrom in the direction of travel of the slide from its receiving to its dropping position.

7. In a planter, the combination with the axle, of a disk carried thereby, dropping mechanism provided with an operating part arranged adjacent said disk and a series of adjustable fingers pivoted upon said disk and each arranged to be independent thrown into or out of position to engage and operate the dropping mechanism.

RUDOLPH STUCKWISCH.

Witnesses:
ARTHUR M. HOOD,
BERTHA M. BALLARD.